United States Patent [19]

Shimada et al.

[11] Patent Number: 5,877,830
[45] Date of Patent: Mar. 2, 1999

[54] LIQUID CRYSTAL DISPLAY DEVICE HAVING A LIGHT BLOCKING LAYER IN THE PERIPHERY

[75] Inventors: Yoshinori Shimada; Takayuki Shimada, both of Yamatokoriyama, Japan

[73] Assignee: Sharp Kabushiki Kaisha, Osaka, Japan

[21] Appl. No.: 712,978

[22] Filed: Sep. 12, 1996

[30] Foreign Application Priority Data

Sep. 13, 1995 [JP] Japan ................................. 7-235742

[51] Int. Cl.$^6$ ........................... G02F 1/136; G02F 1/1333
[52] U.S. Cl. ......................... 349/113; 349/111; 349/138; 349/46; 349/43
[58] Field of Search ............................. 349/46, 110, 111, 349/43, 39

[56] References Cited

U.S. PATENT DOCUMENTS

| | | | |
|---|---|---|---|
| 4,927,493 | 5/1990 | Yamazaki et al. | 349/187 |
| 5,032,883 | 7/1991 | Wakai et al. | |
| 5,142,392 | 8/1992 | Ueki et al. | 349/111 |
| 5,166,085 | 11/1992 | Wakai et al. | 349/42 |
| 5,187,602 | 2/1993 | Ikeda et al. | 349/41 |
| 5,285,301 | 2/1994 | Shirahashi et al. | 349/111 |
| 5,365,357 | 11/1994 | Ohagawara et al. | 349/111 |
| 5,418,635 | 5/1995 | Mitsui et al. | 349/113 |
| 5,446,562 | 8/1995 | Sato | 349/42 |
| 5,552,910 | 9/1996 | Okano | 349/41 |
| 5,585,915 | 12/1996 | Noda et al. | 437/40 |
| 5,617,230 | 4/1997 | Ohagawara et al. | 349/110 |

FOREIGN PATENT DOCUMENTS

| | | |
|---|---|---|
| 135351 | 7/1989 | Japan . |
| 4307521 | 10/1992 | Japan . |
| 474714 | 11/1992 | Japan . |
| 6230422 | 8/1994 | Japan . |

OTHER PUBLICATIONS

Fujita et al: "Colorless Polyimide," vol. 29, No. 1 (Jun. 1991), pp. 20–28.

Sakamoto et al: "27.3: A High–Aperture–Ratio 3–in.–Diagonal VGA a–Si Light Valve with Pixel/Data and Pixel/Gate Lines Overlapping," *SID 96 Digest,* pp. 681–684, 1996.

Kim et al: "4:3: High–Aperture and Failt–Tolerant Pixel Structure for TFT–LCDs," *SID 95 Digest,* pp. 15–18, 1995.

*Primary Examiner*—William L. Sikes
*Assistant Examiner*—Toan Ton
*Attorney, Agent, or Firm*—Nixon & Vanderhye P.C.

[57] ABSTRACT

A light-transmitting interlayer insulating film is provided over TFTs, gate signal lines and source signal lines. Pixel electrodes are provided on the interlayer insulating film, The signal lines and the pixel electrodes partially overlap each other via the interlayer insulating film which has such a low dielectric constant that substantially no capacitance is generated therein. Each pixel electrode is connected to a drain electrode of each TFT at the bottom of a contact hole passing through the depth of the interlayer insulating film. A light-blocking film is provided so as to partially overlap a periphery of a display area.

11 Claims, 6 Drawing Sheets

LIQUID CRYSTAL DISPLAY DEVICE HAVING A LIGHT BLOCKING LAYER IN THE PERIPHERY

RELATED APPLICATIONS

This application is related to the following commonly assigned co-pending applications: Ser. No. 08/695,632, filed Aug. 12, 1996; Ser. No. 08/700,712, filed Aug. 20, 1996; Ser. No. 08/697,277, filed Aug. 27, 1996; Ser. No. 08/705,759, filed Aug. 30, 1996; and Ser. No. 08/725,663, filed Oct. 1, 1996.

BACKGROUND OF THE INVENTION

1. Field of the Invention

The present invention relates to a liquid crystal display device having switching elements such as thin film transistors (hereinafter referred to as "TFTs") which controllably switches pixels on/off for displaying images.

2. Description of the Related Art

A known liquid crystal display device 100 has an equivalent circuit such as that shown in FIG. 5. FIG. 6 is a cross-sectional view of the liquid crystal display device 100. The liquid crystal display device 100 will be described with reference to FIGS. 5 and 6. The liquid crystal display device 100 includes a pair of glass substrates 101a and 111a, i.e., an active matrix substrate 101 and a counter substrate 111, provided so as to oppose each other with a liquid crystal layer 113 interposed therebetween. The active matrix substrate 101 includes TFTs 23 as switching elements and pixel capacitors 22 arranged in a matrix. Each pixel capacitor 22 includes an liquid crystal capacitor 22a and a storage capacitor 22b. A gate electrode 103a of each TFT 23 is connected to a gate signal line 103, which carries signals for driving the TFTs 23, A source electrode 104 of each TFT 23 is connected to a source signal line 108, which carries data signals, e.g., a video signal. The gate signal lines 103 and the source signal lines 108 are provided so as to cross each other. A drain electrode of each TFT 23 is connected to a pixel electrode 106 and one of the two terminals of each storage capacitor 22b. The other terminal of the storage capacitor 22b is connected to a pixel capacitor line 25 which is connected to a counter electrode 112 formed on the counter substrate 111.

As shown in FIG. 6, the active matrix substrate 101 and the counter substrate 111 are provided so as to oppose each other with a liquid crystal layer 113 interposed therebetween. The TFT 23 includes the gate electrode 103a, a drain electrode 105 and a source electrode 104, each of the three electrodes being isolated from one another by a thin film semiconductor layer 102. An insulating film 110 is provided on the glass substrate 101 so as to cover the TFT 23. The insulating film 110 has contact holes formed in the depth direction therethrough. A conductive layer 109 and the source signal line 108 are provided on the insulating layer 110 in such a manner that a portion of the conductive layer 109 and a portion of the source signal line 108 fill the contact holes. The conductive layer 109 is electrically connected to the pixel electrode 106, which is also provided on the insulating layer 110, whereby the pixel electrode 106 is electrically connected to the drain electrode 105. An alignment film 114 is formed on each of the active matrix substrate 101 and the counter substrate 111.

In the conventional liquid crystal display device 100, a black matrix (not shown) having openings each corresponding to one pixel is provided on the counter substrate 111 for shielding regions of a display area of the active matrix substrate 101 except for the pixel electrodes 106. The display area of the active matrix substrate 101 is defined by the outer sides of the outermost pixel electrodes 106 arranged in a rectangular shape on the active matrix substrate 101. With this configuration, the black matrix needs to have an attachment margin for attachment of the active matrix substrate 101 having the pixel electrodes 106 to the counter substrate 111 having the black matrix. Consequently, the periphery of each opening of the black matrix is placed inside the periphery of each pixel, whereby the aperture ratio of the liquid crystal display device 100 can be restricted.

In order to solve such a problem, it has been proposed, in lieu of providing a black matrix, to block light incident on regions of the display area of the active matrix substrate 101 except for the pixel electrodes 106 using the signal lines 103 and 108 so arranged as to partially overlap the peripheries of the pixel electrodes 106. In this case, the aperture ratio of each pixel is defined by two adjoining gate signal lines 103 and two adjoining source signal lines 108. Thus, it is possible to realize the highest possible aperture ratio for an active matrix substrate. However, the gate signal line 103 and the source signal line 108 for one pixel each run along only one side of the pixel. Consequently, no signal lines exist on two sides of the display area. Therefore, light incident on two sides of the display area is not blocked.

SUMMARY OF THE INVENTION

A liquid crystal display device of this invention includes: a first substrate; a liquid crystal layer; and a second substrate opposing the first substrate with the liquid crystal layer interposed therebetween, wherein the first substrate includes a plurality of gate signal lines, a plurality of source signal lines, a light-transmitting interlayer insulating film and a plurality of pixel electrodes arranged in a matrix, the second substrate includes a light-blocking film, the gate signal lines and the source signal lines at least partially overlap the plurality of pixel electrodes with the interlayer insulating film interposed therebetween, and the light-blocking film partially overlaps a periphery of a display area of the first substrate.

In one embodiment of the invention, the liquid crystal display device further includes: switching elements each connected to one of the gate signal lines and one of the source signal lines; and a plurality of contact holes passing through the depth of the interlayer insulating film.

In another embodiment of the invention, the light-blocking film comprises an opening corresponding to the display area, and an inner periphery of the light-blocking film partially overlaps one of the gate signal lines and one of the source signal lines.

In still another embodiment of the invention, a dummy line is provided on the first substrate along a side of the display area, the dummy line partially overlapping the outer sides of the pixel electrodes arranged along the side of the display area with the interlayer insulating film interposed therebetween, and the dummy line partially overlapping the inner periphery of the light-blocking film.

In still another embodiment of the invention, each of the switching elements is provided near a crossing of each of the gate signal lines and each of the source signal lines, and each of the pixel electrodes is electrically connected to a light-transmitting connecting electrode at the bottom of the contact hole passing through the depth of the interlayer insulating film, the connecting electrode extending from a drain electrode of each of the switching elements.

In still another embodiment of the invention, the liquid crystal display device further includes storage capacitor lines, wherein each of the contact holes is provided above each of the storage capacitor lines.

In still another embodiment of the invention, the interlayer insulating film is made of a photosensitive acrylic resin.

In still another embodiment of the invention, the pixel electrode and at least one of the source signal line and the gate signal line partially overlap each other by about 1 $\mu$m or more in a line width direction.

In still another embodiment of the invention, the thickness of the interlayer insulating film is about 1.5 $\mu$m or more.

A liquid crystal display device according to the present invention includes an active matrix substrate and a counter substrate provided so as to oppose each other with a liquid crystal layer interposed therebetween, the counter substrate having a frame-shaped light-blocking film provided thereon which covers only an area outside a display area. Thus, it is possible to realize the highest possible aperture ratio for an active matrix even with the light-blocking film provided in the liquid crystal display device. In this configuration, the periphery of each pixel electrode partially overlaps adjoining gate signal lines and adjoining source signal lines.

In the case where the light-blocking film has an opening corresponding to the display area so as to be frame-shaped, and therefore, two sides of the inner periphery of the light-blocking film partially overlap the outermost gate signal line and the outermost source signal line, light is well prevented from leaking through the periphery of the display area. In this case, the other two sides of the inner periphery of the light-blocking film, i.e., those to which no corresponding signal lines exist, are aligned with the corresponding two sides of the display area.

Moreover, in the case where dummy lines are formed on the active matrix substrate along the two sides of the display area where no corresponding signal lines exist, each side of the inner periphery of the frame-shaped light-blocking film partially overlaps a signal line or a dummy line so as to block light incident on any side of the display area, thereby well preventing light from leaking therethrough.

Furthermore, each switching element is provided near a crossing of each gate signal line and each source signal line. A transparent connecting electrode which extends from a drain electrode of each switching element is connected to each pixel electrode at an end of the connecting electrode opposite the drain electrode at the bottom of a contact hole passing through the depth of a light-transmitting interlayer insulating film. In such a case, owing to the existence of the interlayer insulating film, the active matrix substrate may be designed so that each pixel electrode partially overlaps the signal lines or the dummy lines. As described later, the interlayer insulating film used in the present invention has such a low dielectric constant that substantially no capacitance is generated therein. Therefore, it is possible to improve the aperture ratio of the display while depressing disturbance in the orientation of the liquid crystal molecules due to the signal lines.

Thus, the invention described herein makes possible the advantages of (1) providing a liquid crystal display device in which the highest possible aperture ratio for an active matrix substrate can be realized, while light incident on any side of the display area can be blocked; and (2) providing a liquid crystal display device in which the pixel electrodes partially overlap the signal lines, thereby improving the aperture ratio of the liquid crystal display device while depressing disturbance in the orientation of the liquid crystal molecules.

These and other advantages of the present invention will become apparent to those skilled in the art upon reading and understanding the following detailed description with reference to the accompanying figures.

DESCRIPTION OF THE PREFERRED EMBODIMENTS

Hereinafter, an example of the present invention will be described with reference to the accompanying figures.

Figure 2:
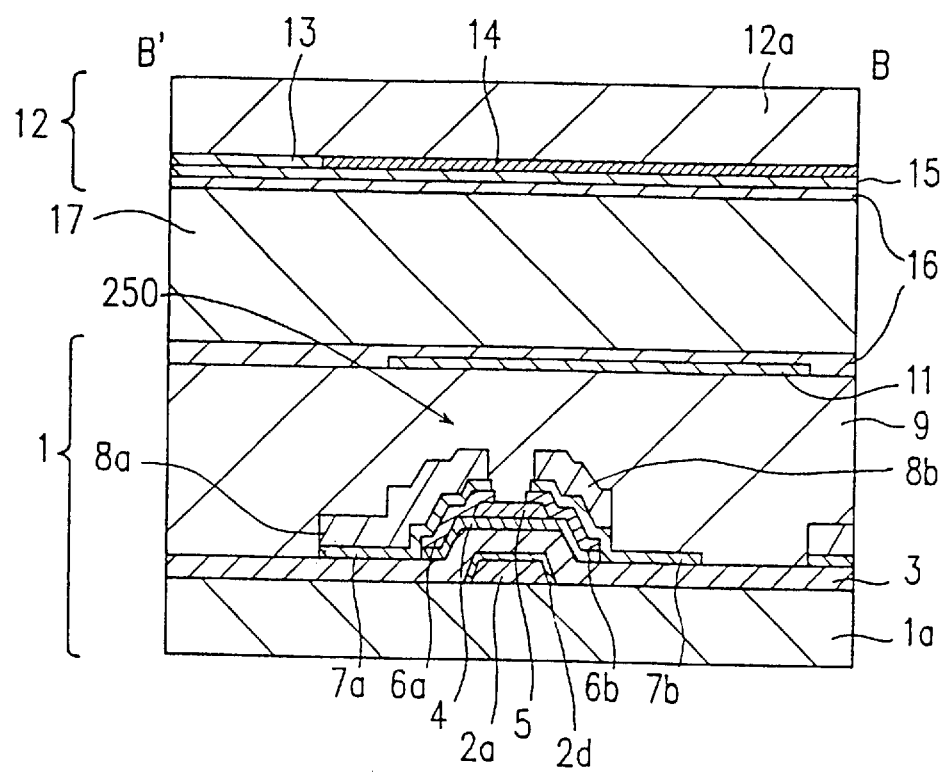
FIG. 2 is a cross-sectional view of the liquid crystal display device shown in FIG. 1 taken along the line B–B'.
Figure 3:
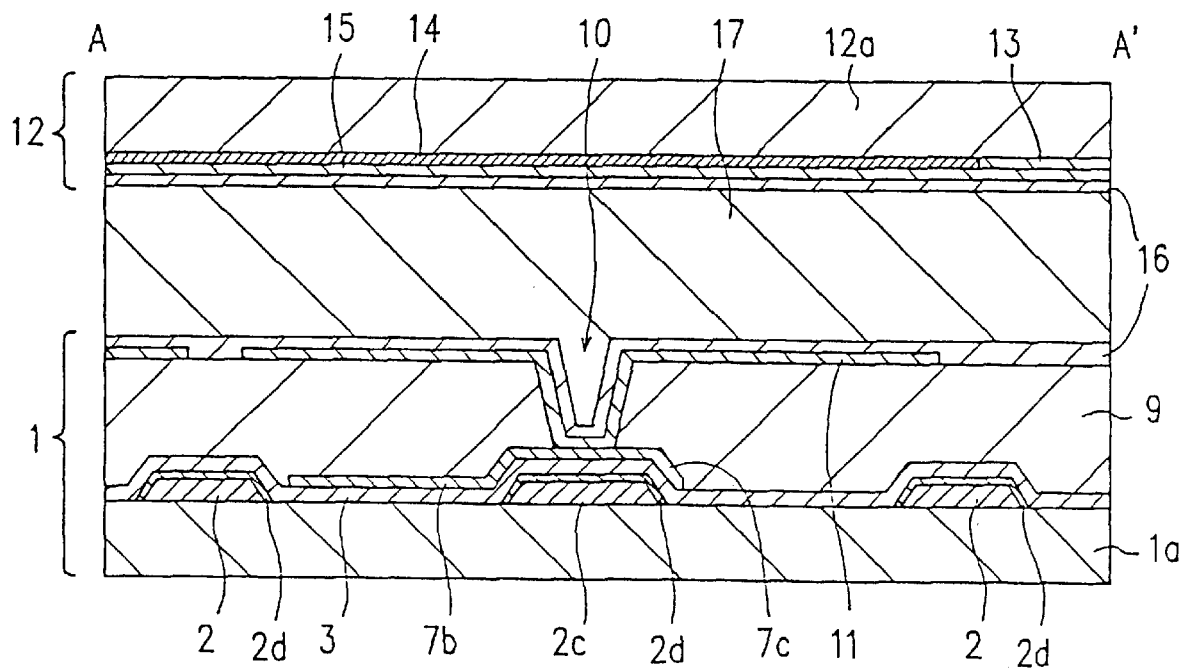
FIG. 3 is a cross-sectional view of the liquid crystal display device shown in FIG. 1 taken along the line A–A'.

As shown in FIGS. 2 and 3, the liquid crystal display device 200 includes an active matrix substrate 1 and a counter substrate 12 opposing each other with a liquid crystal layer 17 interposed therebetween.

Figure 1:
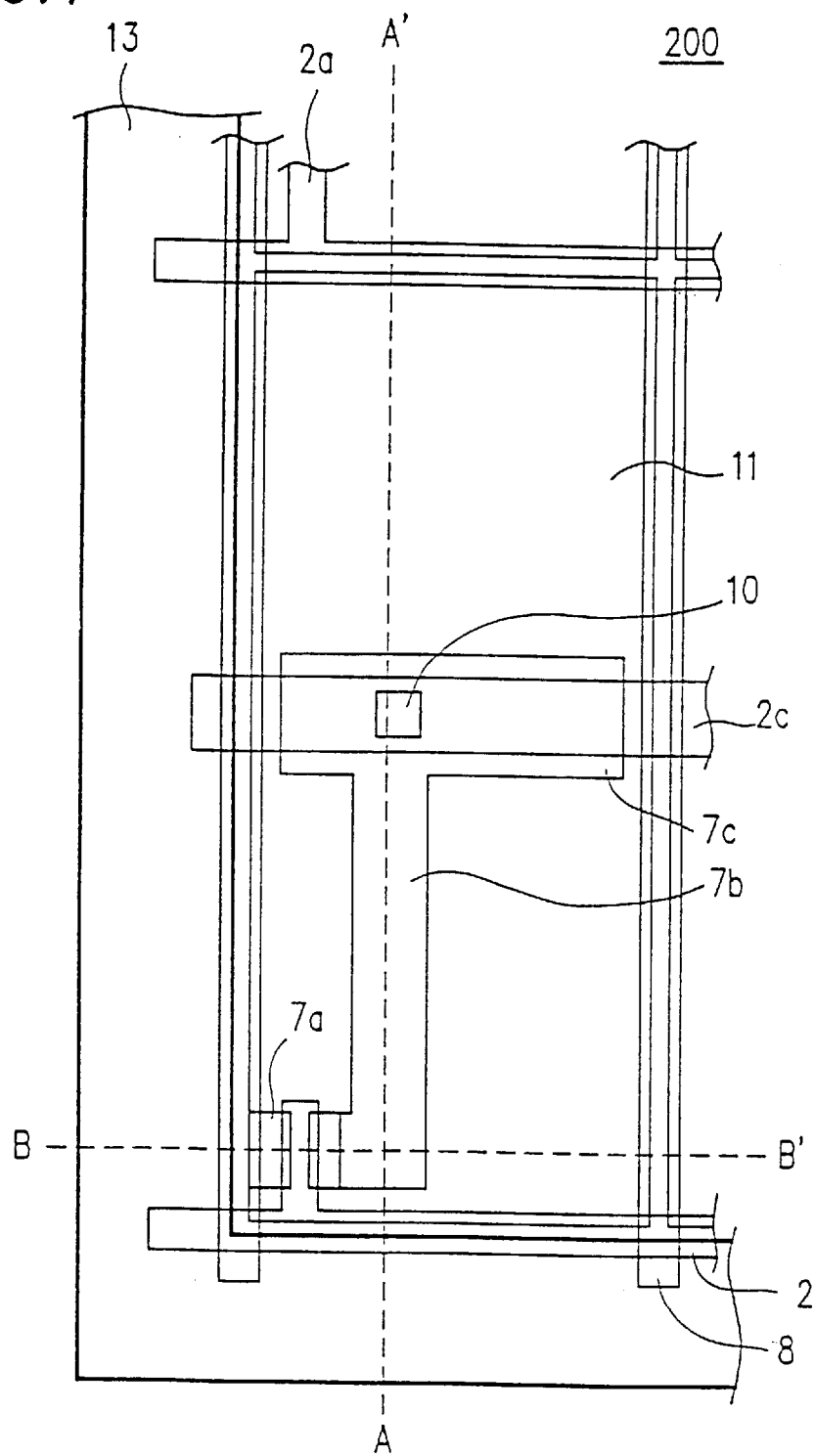
FIG. 1 is a plan view showing a part of a liquid crystal display device corresponding to one pixel electrode according to an example of the present invention.
Figure 4:
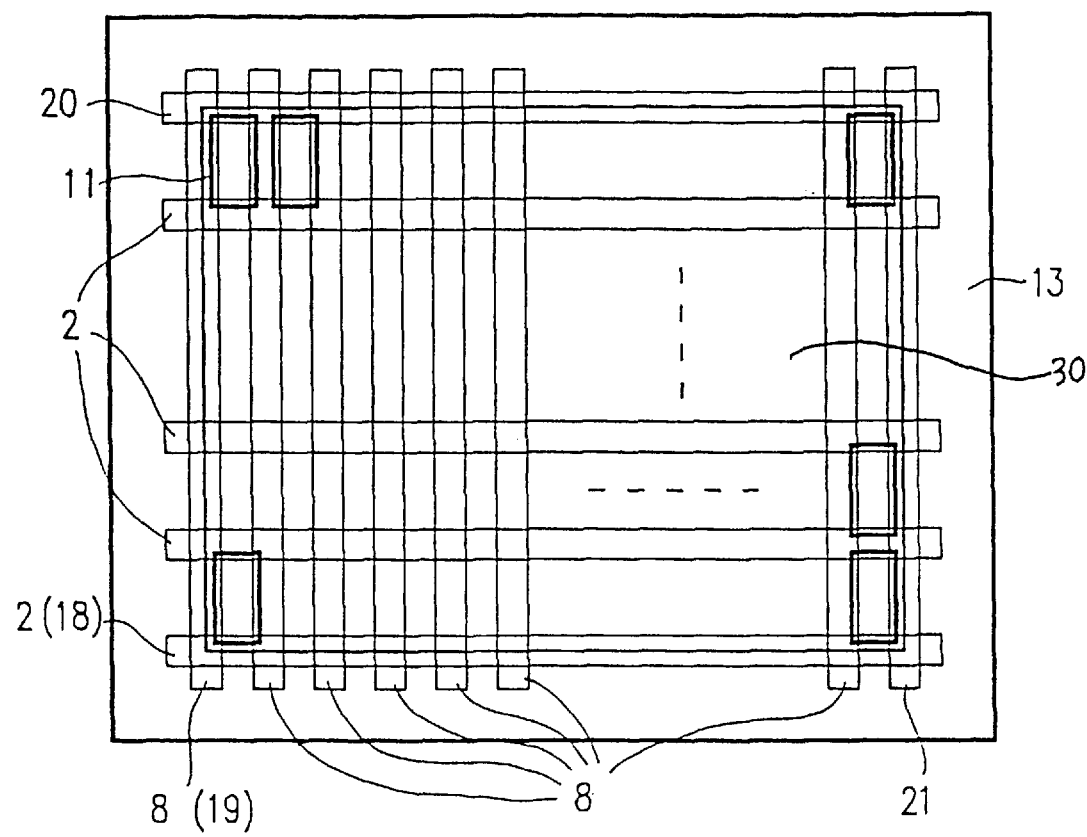
FIG. 4 is a schematic plan view of the liquid crystal display device shown in FIG. 1.
Figure 5:
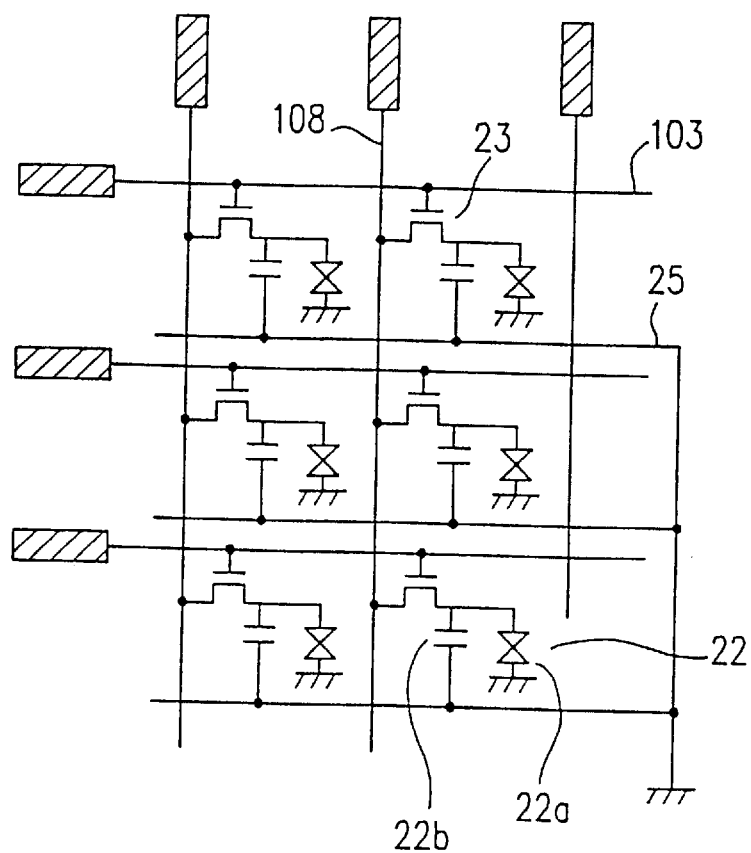
FIG. 5 is an equivalent circuit diagram of a conventional liquid crystal display device.
Figure 6:
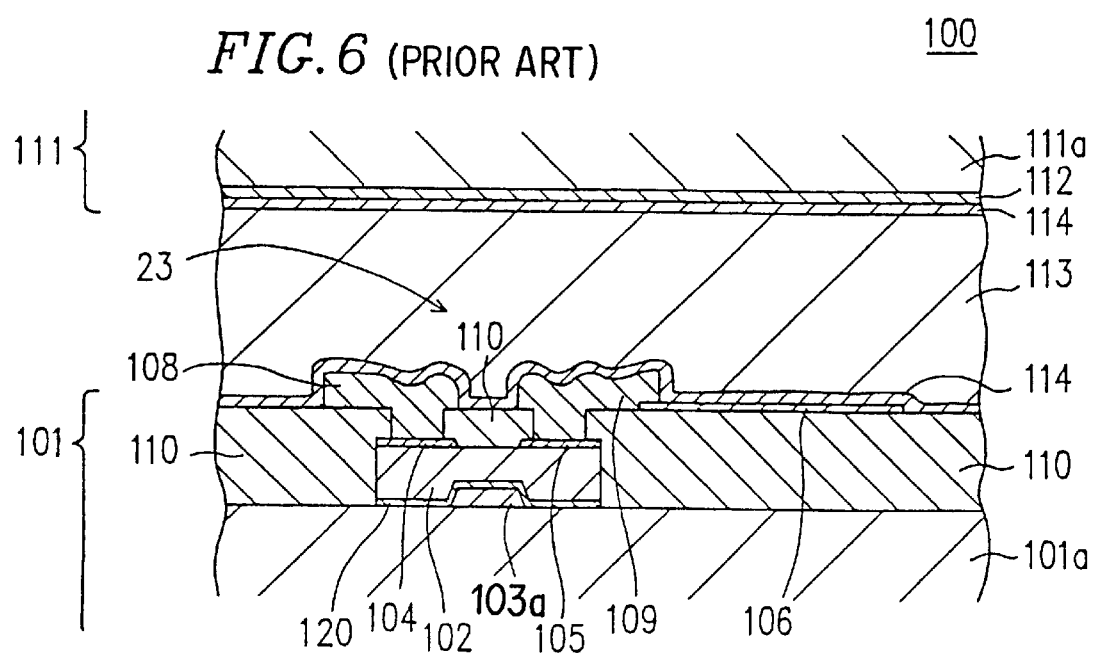
FIG. 6 is a cross-sectional view of the conventional liquid crystal display device shown in FIG. 5.

Referring to FIG. 4, the active matrix substrate 1 includes a plurality of gate signal lines 2 and a plurality of source signal lines 8 provided on a transparent insulating substrate 1a (not shown in FIG. 4) so as to cross each other. As shown in FIG. 1, storage capacitor lines 2c (only one is shown) are also provided on the transparent insulating substrate 1a parallel to the gate signal lines 2. Each gate signal line 2 has a gate electrode 2a extending therefrom near a crossing of each gate signal line 2 and each source signal line 5. Each gate electrode 2a is included in a TFT 250 as described below.

The structure of the liquid crystal display device 200 will be described in detail with reference to FIGS. 2 and 3. FIGS. 2 and 3 show a cross section corresponding to one pixel electrode for simplicity.

The active matrix substrate 1 includes the transparent insulating substrate 1a, the gate electrode 2a, the storage capacitor lines 2c and a gate insulating film 3 provided on the entire surface of the substrate 1a so as to cover the gate signal line 2, the gate electrodes 2a and the storage capacitor lines 2c. Anodized films 2d may be optionally provided by partially anodizing the gate signal lines 2, the gate electrodes 2a and the storage capacitor lines 2c.

A semiconductor layer 4 is provided on the gate insulating film 3 so as to be superimposed over the gate electrode 2a. A channel protective layer 5 is provided on a central area of the semiconductor layer 4. A source electrode 6a and a drain electrode 6b formed of n$^+$-Si are provided so as to cover end portions of the channel protective layer 5 and an area of the semiconductor layer 4. The source electrode 6a and the drain electrode 6b are spaced apart from each other on the channel protective layer 5.

A transparent conductive film 7a is provided on the gate insulating film 3 and the source electrode 6a, and a metal layer 8a is provided on the conductive film 7a. Another transparent conductive film 7b is provided on the gate insulating film 3 and the drain electrode 6b, and a metal layer 8b is provided on the conductive film 7b. The transparent conductive films 7a and 7b act as light-transmitting connecting electrodes. As shown in FIGS. 1 and 3, the connecting electrode 7b has substantially a J-shape. The connecting electrode 7b extends in the direction of the line A–A' over the storage capacitor line 2c with the gate insulating film 3 interposed therebetween. The connecting electrode 7b further extends in the longitudinal direction of the storage capacitor line 2c to form a storage capacitor electrode 7c.

Returning to FIGS. 2 and 3, the source signal line 8 has a double layered structure of the metal layer 8a and the transparent electrode 7a. Therefore, even when the metal layer 8a has a defective portion, e.g., a disconnected portion, the electrical connection thereof is retained by the transparent conductive film 7a.

The metal layer 8b formed on the transparent conductive layer 7b reduces the electrical resistance of the transparent conductive layer 7b.

As you may recall, the TFT 250 includes the gate electrode 2a, the anodized layer 2d, the gate insulating layer 3, the semiconductor layer 4, the channel protective layer 5, the source electrode 6a, and the drain electrode 6b.

A light-transmitting interlayer insulating film 9 is provided on the substrate 1a so as to cover the above-described multi-layered configuration. A pixel electrode 11 made of a transparent conductive film is provided on the interlayer insulating film 9. As best shown in FIG. 1, the pixel electrode 11 partially overlaps two adjoining gate signal lines 2 and two adjoining source signal lines 8.

The interlayer insulating film 9 of the present invention has a dielectric constant of 3.4 to 3.8 which is considerably lower than that of a conventional insulating film. Therefore, it is possible to form the pixel electrodes 11 to overlap the signal lines 2 and 8 with the interlayer insulating film 9 interposed therebetween.

Referring to FIG. 3, the pixel electrode 11 and the storage capacitor electrode 7c are electrically connected to each other at the bottom of a contact hole 10 passing through the depth of the interlayer insulating film 9. Consequently, the pixel electrode 11 is electrically connected to the drain electrode 6b via the transparent conductive layer 7b.

The contact hole 10 is formed above the storage capacitor line 2c. The storage capacitor line 2c is connected to a counter electrode 15 provided in the counter substrate 12 via a line (not shown). The portion where the storage capacitor electrode 7c is superimposed over the storage capacitor line 2c forms a storage capacitor.

The counter substrate 12 is provided so as to oppose the active matrix substrate 1 with the liquid crystal layer 17 interposed therebetween. The counter substrate 12 includes a transparent insulating substrate 12a, a black mask 13 serving as a light-blocking film made of a metal film or the like and color filters 14 provided on the substrate 12a. The counter electrode 15 made of a transparent conductive film is provided on the black mask 13 and the color filters 14.

The active matrix substrate 1 and the counter substrate 12 each include an alignment film 16 in contact with the liquid crystal layer 17.

As can be appreciated from FIG. 4, the display area 30 is an area defined by a line connecting the outer sides of the outermost pixel electrodes arranged in a rectangular shape on the active matrix substrate 1. The black mask 13 has an opening corresponding to the display area so as to be frame-shaped and is provided only on an area of the substrate 12a corresponding to the area outside the display area 30. Since the pixel electrode 11 is positioned so as to partially overlap two adjoining gate signal lines 2 and two adjoining source signal lines 8, light incident on the areas between pixel electrodes inside the display area 30 is blocked by the gate signal lines 2 and the source signal lines 8.

With an attachment margin taken into consideration, as shown in FIGS. 1 and 4, the inner periphery of the black mask 13 is placed so as to partially overlap a portion of the outermost (downmost in FIG. 4) gate signal line 2(18) and a portion of the outermost (leftmost in FIG. 4) source signal line 8(19) on the active matrix substrate, the portions protruding from the display area 30. Thus, the black mask 13 may have an attachment margin of a width up to the width of the signal lines 2(18) and 8(19). In this case, the area of the opening of the black mask 13 can be enlarged by the widths of the outermost signal lines 2(18) and 8(19). Accordingly, the aperture ratio of the display device can be improved in comparison with the case where the entire inner periphery of the black mask 13 overlaps the outermost pixel electrodes 11.

Furthermore, as shown in FIG. 4, a dummy line 20 can be formed on the side opposite the outermost gate signal line 2(18). Similarly, another dummy line 21 is formed on the side opposite the outermost source signal line 8(19). Then, the inner periphery of the black mask 13 is placed so as to partially overlap the gate signal line 2(18), the source signal line 8(19) and the two dummy lines 20 and 21. Thus, the black mask 13 may have an attachment margin of a width up to the width of the signal lines 2(18) and 8(19) and the dummy lines 20 and 21. In this case, the area of the opening of the black mask 13 can be enlarged by the widths of the outermost signal lines 2(16) and 8(19), and the dummy lines 20 and 21 Accordingly, the aperture ratio of the display device can be further improved in comparison with the case where the entire inner periphery of the black mask 13 overlaps the outermost pixel electrodes 11, or the case where two lines of the inner periphery of the black mask 13 overlap the outermost pixel electrodes 11 and the other two lines thereof overlap the outermost signal lines 2(18) and 8(19).

Hereinafter, an exemplary method for fabricating the liquid crystal display device 200 will be described with reference to FIGS. 2 and 3.

First, the active matrix substrate 1 is fabricated, for example, as follows.

The gate signal lines 2, the gate electrodes 2a and the storage capacitor lines 2c are simultaneously formed on the transparent insulating substrate 1a formed of a glass material or the like. The gate signal lines 2, the gate electrodes 2a end the storage capacitor lines 2c may be partially anodized to form the anodized films 2d thereon.

Subsequently, the gate insulating film 3, the semiconductor layer 4, the channel protective layer 5 and n$^+$-Si layers, respectively, to serve as the source electrode 6a and the drain electrode 6b are sequentially formed on the substrate 1a. Next, the connecting electrodes 7a and 7b made of ITO and the metal layers 8a and 8b are sequentially formed thereon by sputtering and patterning. The storage capacitor electrodes 7c are simultaneously formed with the connecting electrodes 7a and 7b. Since the connecting electrode 7a is below the metal layer 8a, even when the metal layer 8a has a defective portion, the electrical connection thereof is retained by the transparent conductive film 7a. Thus, the occurrence of disconnection of the source signal lines 8 is reduced.

Then a photosensitive acrylic resin is deposited to form the light-transmitting interlayer insulating film 9, after which the interlayer insulating film 9 is exposed to light according to a predetermined pattern and developed with an alkaline solution. Only portions of the interlayer insulating film 9 exposed to light are etched, thus forming the contact hole 10 passing through the depth of the interlayer insulating film 9.

As a material for the interlayer insulating film 9, a photosensitive acrylic resin (positive-type photosensitive acrylic resin) having a high transparency (about 90% or more transparency for light having a wavelength in the range of about 400 to about 800 nm) with the photosensitive portion thereof being soluble in a developing solution can be used.

The positive-type photosensitive acrylic resin is preferably a material composed of a copolymer of methacrylic acid and glycidyl methacrylate as a base polymer mixed with a naphthoquinone diazide positive-type photosensitive agent, for example. Since this resin contains the glycidyl group, it con be crosslinked (cured) by heating. After curing, the resin has the properties of: a dielectric constant of about 3.4; and a transmittance of about 90% or more for light with a wavelength in the range of about 400 to about 800 nm. The resin can be decolored in a shorter time by being irradiated with i-line (365 nm) ultraviolet light. Ultraviolet light other than the i line can be used for patterning. Since the heat resistance of the photosensitive acrylic resin used in this example is about 280° C., the degradation of the interlayer insulating film can be suppressed by conducting the process such as the formation of the pixel electrodes after the formation of the interlayer insulating film at a temperature in the range of about 250° C. to 280° C.

Subsequently, a transparent conductive film is formed on the interlayer insulating film 9 by sputtering and patterning to form the pixel electrodes 11. Each pixel electrode 11 is electrically connected to the connecting electrode 7b and also to the storage capacitor electrode 7c at the bottom of the contact hole 10. Via the connecting electrode 7b, the pixel electrode 11 is electrically connected to the drain electrode 6b. In the case where dummy lines are formed as shown in FIG. 4, it is preferable to form the dummy line 20 simultaneously with the gate signal lines 2 and to form the dummy line 21 simultaneously with the source signal lines 8 for a simpler fabrication process.

Thus, the interlayer insulating film 9 is located between the pixel electrode 11 and the gate and source signal lines 2 and 8. Accordingly, it is possible to partially overlap the pixel electrodes over the signal lines 2 and 8. In the liquid crystal display device having such a structure, the aperture ratio can be improved, and an electric field generated by the signal lines 2 and 8 is shielded by the pixel electrode 11 to depress the occurrence of disclination. Moreover, any light leakage which may occur in the vicinity of the contact hole 10 due to a disturbance in the orientation of the liquid crystal molecules would not lower the contrast because the light is blocked by the storage capacitor line 2c below the contact hole 10. Furthermore, since the drain electrode 6b of the TFT 250, the pixel electrode 11 and the storage capacitor electrode 7c are connected to one another via the connecting electrode 7b, the aperture ratio will not be lowered even when the contact hole 10 is formed above the storage capacitor lines 2c.

Hereinafter, an exemplary method for fabricating a counter substrate 12 will be described. The counter substrate 12 may be formed before or simultaneously with the active matrix substrate 1.

First, a metal film or the like which does not transmit light is deposited-on the transparent insulating substrate 12a by sputtering and patterning to form the black mask 13 to cover only the area of the transparent insulating substrate 12a which is outside the display area 30.

In the display area 30, a photosensitive color resist is applied to the substrate 12a, exposed to light and then developed to form the color filters 14 having the colors red, green and blue. Then, a transparent conductive film formed of ITO or the like is deposited on the black mask 13 and the color filters 14 by sputtering to form the counter electrode 15.

Subsequently, the alignment film 16 is formed on each of the active matrix substrate 1 and the counter substrate 12, and then the two substrates 1 end 12 are attached together with an interspace therebetween. A liquid crystal material is injected into the interspace between the two substrates 1 and 12 to form the liquid crystal layer 17, and then the liquid crystal layer 17 is sealed.

As clearly described hitherto, according to the present invention a light-blocking film is provided so as to cover only the area outside the display area defined above. Due to such a structure, it is possible to realize the highest possible aperture ratio for an active matrix substrate even with the light-blocking film provided.

In the case where the light-blocking film has an opening corresponding to the display area so au to be frame-shaped, and therefore, two sides of the inner periphery of the light-blocking film partially overlap the outermost gate signal line and the outermost source signal line, light is well prevented from leaking through the periphery of the display area. In this case, the other two sides of the inner periphery of the light-blocking film, i.e., those to which no corresponding signal lines exist, are aligned with the corresponding is two sides of the display area.

Moreover, in the case where dummy lines are formed on the active matrix substrate along the two sides of the display area where no corresponding signal lines exist, the inner periphery of the frame-shaped light-blocking film partially overlaps the provided dummy lines as well as the outermost gate and source signal lines. Thus, light is well prevented from leaking through any portion of the periphery of the display area.

Furthermore, each switching element is provided near a crossing of each gate signal line and each source signal line. A transparent connecting electrode which extends from a drain electrode of each switching element is connected to each pixel electrode at an end of the connecting electrode opposite the drain electrode at the bottom of a contact hole passing through the depth of a light-transmitting interlayer Insulating film. In such a case, owing to the existence of the interlayer insulating film which has such a low dielectric constant that substantially no capacitance is generated therein, the active matrix substrate may be designed so that each pixel electrode partially overlaps the signal lines or the dummy lines. Therefore, it is possible to improve the aperture ratio of the display while depressing disturbance in the orientation of the liquid crystal molecules due to the signal lines.

The acrylic resin constituting the interlayer insulating film 9 has a dielectric constant of about 3.4 to about 3.8 which is lower than that of an inorganic film (e.g., the dielectric constant of silicon nitride is about 8) and a high transparency. Also, since the spin coating is employed, a thickness as large as about 3 $\mu$m can be easily obtained. This reduces the capacitances between the gate signal line 2 and the pixel electrode 11 and between the source signal lines 8 and the pixel electrodes 11, lowering the time constant. As a result, the influence of the capacitances between the lines 2 and 8 and the pixel electrode 11 appearing on the display, such as crosstalk, can be reduced, and thus a good and bright display can be obtained.

The contact hole 10 can be formed into a sharp tapered shape by the patterning including the exposure to light and the alkaline development. This facilitates a better connection between the pixel electrode 11 and the transparent conductive film 7b.

Further, since the photosensitive acrylic resin Is used, the thick film having a thickness of several micrometers can be easily formed by spin coating. No photoresist process is required at the patterning step. This is advantageous in production. Though the acrylic resin used as the interlayer insulating film 9 is colored before the coating, it can be made transparent optically by exposing the entire surface to light after the patterning step. The resin can also be made transparent chemically.

In this example, the photosensitive resin used as the interlayer insulating film 9 is, in general, exposed to light from a mercury lamp including the emission spectrum of an i line (wavelength; 355 nm), an h line (wavelength: 405 nm), and a g line (wavelength: 436 nm). The i line has the highest energy (i.e., the shortest wavelength) among these emission lines, and therefore, it is desirable to use a photosensitive resin having a reactive peak (i.e., absorption peak) at the i line. This makes it possible to form the contact holes with high precision, and moreover, since the peak is farthest from the visible light, coloring caused by the photosensitive agent can be minimized. A photosensitive resin reactive to ultraviolet light having short wavelength emitted from an excimer laser can also be used. By using such an interlayer insulating film substantially free from coloring, the transmittance of the resultant transmission type liquid crystal display device can be increased. Accordingly, the brightness of the liquid crystal display can be increased or the power consumption of the liquid crystal display can be reduced by saving the amount of light needed from a backlight.

Since the thickness of the interlayer insulating film 9 is as large as several micrometers, thicker than that in a conventional liquid crystal display, a resin with a transmittance as high as possible is preferably used. The visual sensitivity of a human eye for blue is a little lower than those for green and red. Accordingly, even if the spectral transmittance of the film has slightly lower transmittance for blue light than that for green and red light, the display quality will not be substantially deteriorated. Though the thickness of the interlayer insulating film 9 was made about 3 $\mu$m in this example, it is not limited to about 3 $\mu$m. The thickness of the interlayer insulating film may be set depending on the transmittance and the dielectric constant of the film. In order to reduce the capacitance, the thickness is preferably equal to or greater than about 1.5 $\mu$m, more preferably equal to or greater than about 2.0 $\mu$m.

In the case where the thickness of the interlayer insulating film 9 is equal to or greater than about 1.5 $\mu$m, the capacitance between the pixel electrode 11 and the source signal line 8 (the gate signal line 2) is small enough to perform a display without crosstalk, even if the overlap width of the pixel electrode 11 and the source signal line 8 (the gate signal line 2) is about 1.0 $\mu$m or more.

The overlap width should be set in consideration of variations in the actual fabrication process. For example, it is preferably about 1.0 $\mu$m or more, because the attachment margin between the pixel electrode 11 and the gate and source signal lines 2 and 8 becomes large.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
    a first substrate;
    a liquid crystal layer; and
    a second substrate opposing the first substrate with the liquid crystal layer interposed therebetween, wherein:
        the first substrate includes a plurality of gate signal lines, a plurality of source signal lines, a light-transmitting interlayer insulating film and a plurality of pixel electrodes arranged in a matrix, where said matrix of pixel electrodes forms a display area,
        the second substrate includes a light-blocking film, having a transparent frame aperture substantially overlapping the display area,
        the gate signal lines and the source signal lines at least partially overlap the plurality of pixel electrodes with the interlayer insulating film interposed therebetween, and
        the frame aperture of the light-blocking film having an inner periphery partially overlapping a periphery region of the display area.

2. A liquid crystal display device according to claim 1, further comprising:
    switching elements each connected to one of the gate signal lines and one of the source signal lines; and
    a plurality of contact holes passing through the depth of the interlayer insulating film.

3. A liquid crystal display device according to claim 2, wherein
    each of the switching elements is provided near a crossing of each of the gate signal lines and each of the source signal lines, and
    each of the pixel electrodes is electrically connected to a light-transmitting connecting electrode at the contact hole passing through the depth of the interlayer insulating film, the connecting electrode extending from a drain electrode of each of the switching elements.

4. A liquid crystal display device according to claim 2, further comprising storage capacitor lines, wherein each of the contact holes is provided above one of the storage capacitor lines.

5. A liquid crystal display device according to claim 1, wherein a dummy line is provided on the first substrate along a side of the display area, the dummy line partially overlapping a row or a column of pixel electrodes arranged along the side of the display area with the interlayer insulating film interposed therebetween, and the dummy line partially overlapping the inner periphery of the frame aperture of the light-blocking film.

6. A liquid crystal display device according to claim 1, wherein the interlayer insulating film is made of a photosensitive acrylic resin.

7. A liquid crystal display device according to claim 1, wherein the pixel electrode and at least one of the source signal line and the gate signal line partially overlap each other by at least 1 $\mu$m a line width direction.

8. A liquid crystal display device according to claim 1 wherein the thickness of the interlayer insulating film is at least 1.5 $\mu$m.

9. A liquid crystal display comprising:

a liquid crystal layer sandwiched between first and second substrate layers, the first substrate including a plurality of pixel electrodes arranged in a display area, a plurality of gate signal lines and source signal lines, wherein each of said lines traverses the display area and partially overlaps an edge of a row or a column of pixel electrodes in the display area, and the second substrate including a light opaque film having an aperture substantially overlapping the display area, where said aperture is transparent over the entire display area, and said aperture having an outer periphery partially overlapping a gate or source line at an outer periphery of the display area.

10. A liquid crystal display as in claim 9 further comprising a dummy source or gate line partially overlapping a row or a column of pixel electrodes adjacent the outer periphery of the display area, and said dummy line partially overlapping the outer periphery of the aperture of the opaque film.

11. A liquid crystal display as in claim 9 wherein the outer periphery of the aperture extends beyond each of the electrode pixels in said display.

* * * * *